United States Patent
Urushihara

(10) Patent No.: US 10,950,829 B2
(45) Date of Patent: Mar. 16, 2021

(54) SEALING BODY OF CYLINDRICAL BATTERY, AND CYLINDRICAL BATTERY

(71) Applicant: FDK CORPORATION, Tokyo (JP)

(72) Inventor: Kanji Urushihara, Tokyo (JP)

(73) Assignee: FDK CORPORATION, Tokyo (JP)

(*) Notice: Subject to any disclaimer, the term of this patent is extended or adjusted under 35 U.S.C. 154(b) by 0 days.

(21) Appl. No.: 15/937,856

(22) Filed: Mar. 28, 2018

(65) Prior Publication Data

US 2018/0287104 A1    Oct. 4, 2018

(30) Foreign Application Priority Data

Mar. 28, 2017  (JP) .............................. JP2017-062104

(51) Int. Cl.
*H01M 2/04*    (2006.01)
*H01M 2/12*    (2006.01)
(Continued)

(52) U.S. Cl.
CPC ......... *H01M 2/046* (2013.01); *H01M 2/0426* (2013.01); *H01M 2/0478* (2013.01);
(Continued)

(58) Field of Classification Search
CPC .. H01M 2/046; H01M 2/0426; H01M 2/0478; H01M 2/086; H01M 2/06;
(Continued)

(56) References Cited

U.S. PATENT DOCUMENTS

| 5,279,907 A * | 1/1994 | Paterek | H01M 2/1241 429/56 |
| 2005/0287422 A1* | 12/2005 | Kim | H01M 2/1241 429/53 |

(Continued)

FOREIGN PATENT DOCUMENTS

| JP | 1973-067230 U | 11/1971 |
| JP | 2005235531 A | 9/2005 |

(Continued)

OTHER PUBLICATIONS

English Translation of JP 2005235531 (Year: 2005).*
(Continued)

*Primary Examiner* — Christopher P Domone
*Assistant Examiner* — Kimberly Wyluda
(74) *Attorney, Agent, or Firm* — Isshiki International Law Office; Joseph P. Farrar

(57) ABSTRACT

A sealing body of a cylindrical battery, including: a sealing plate with a through-hole formed at a center of a metallic disk and a thin-walled portion formed into a groove in a planar surface of the disk, the sealing plate mounted to a cylindrical battery can having a closed bottom, so as to seal an opening of the battery can, the battery can doubling as an electrode current collector of either a positive or negative electrode and housing a power generating element; an electrode terminal of another of the positive or negative electrode, the electrode terminal including a shaft portion inserted into the through-hole and fitted to the sealing plate;

(Continued)

and a sealing gasket made of resin and interposed between the shaft portion and the through-hole. The thin-walled portion has an arc shape and is not formed along a circle concentric with an outer periphery of the sealing plate.

2 Claims, 5 Drawing Sheets

(51) Int. Cl.
    *H01M 2/08*     (2006.01)
    *H01M 2/06*     (2006.01)
    *H01M 2/30*     (2006.01)

(52) U.S. Cl.
    CPC ........... *H01M 2/0486* (2013.01); *H01M 2/06* (2013.01); *H01M 2/08* (2013.01); *H01M 2/1241* (2013.01); *H01M 2/30* (2013.01); *H01M 2220/30* (2013.01)

(58) Field of Classification Search
    CPC ........ H01M 2/08; H01M 2/1241; H01M 2/30; H01M 2220/30; H01M 2/022; H01M 2/0486
    See application file for complete search history.

(56) References Cited

U.S. PATENT DOCUMENTS

| | | | |
|---|---|---|---|
| 2008/0145748 A1* | 6/2008 | Jung | .................... H01M 2/0404 |
| | | | 429/56 |
| 2016/0293916 A1 | 10/2016 | Yamazaki et al. | |
| 2018/0104921 A1* | 4/2018 | Beyad | .............. B29D 11/00817 |

FOREIGN PATENT DOCUMENTS

| | | |
|---|---|---|
| JP | 2016-195010 A | 11/2016 |
| JP | 2017195165 A * | 10/2017 |

OTHER PUBLICATIONS

English translation of JP-2017195165-A (Year: 2017).*
Office Action in Japanese Patent Application No. 2017-062104, dated Oct. 13, 2020.

* cited by examiner

SEALING BODY OF CYLINDRICAL BATTERY, AND CYLINDRICAL BATTERY

CROSS-REFERENCE TO RELATED APPLICATION

The present application claims priority pursuant to 35 U.S.C. § 119 Japanese Patent Application No. 2017-062104 filed on Mar. 28, 2017 in the Japan Patent Office, the entire contents of which are incorporated herein by reference.

BACKGROUND

Technical Field

This disclosure relates to a sealing body of a cylindrical battery, and the cylindrical battery.

Background Art

A cylindrical battery is used as a power source for various electronic devices such as laptop personal computers and digital cameras. An ordinary cylindrical battery is housed in a tube-shaped battery can having a bottom, in which a power generating element including an electrolyte doubles as either one of a positive or negative electrode current collector. A sealing body sealing an opening of the battery can has a structure to reliably prevent leakage of contents included in the battery can. Additionally, the sealing body includes an explosion-proof safety mechanism to prevent the battery can from bursting by releasing internal pressure to the outside of the battery can if the internal pressure in the battery can increases.

FIG. 1 is a drawing illustrating one example of a cylindrical battery 1. The cylindrical battery 1 illustrated in FIG. 1 is a spiral-type lithium primary battery. FIG. 1 illustrates a vertical cross-sectional view when the cylindrical battery 1 is cut on a planar surface including a cylinder axis 100. The following defines an extension direction of the cylinder axis 100 as an up-down direction, and the respective up and down directions are specified taking an opening end side of a battery can 2 as an upper side.

The cylindrical battery 1 illustrated in FIG. 1 has a basic structure where a positive electrode 3, a negative electrode 4, a separator 5, and a non-aqueous organic electrolyte 30 as power generating elements are housed in the battery can 2 that doubles as a negative electrode current collector, and an opening of the battery can 2 is sealed by a sealing body 20. The positive electrode 3 constituting the power generating element is formed by coating a lath sheet made of stainless steel, for example, with a positive electrode material slurry and cutting the sheet to a predetermined size and then drying it. The negative electrode 4 is made of a plate-shaped lithium metal or a lithium alloy. These negative electrodes 4 and positive electrodes 3 are disposed opposed to one another via the separator 5 formed of, for example, a microporous membrane made of polyolefin to constitute a strip-shaped electrode body 10. This strip-shaped electrode body 10 wound around the cylinder axis 100 is then inserted into the battery can 2.

The sealing body 20 is constituted including a sealing plate 6, a positive electrode terminal 7, a metallic washer 8, and a sealing gasket 9. The sealing plate 6 has a disk shape with an opening (through-hole) 61, which penetrates the center in the up-down direction. In the example illustrated in FIG. 1, an outer periphery 62 of the disk-shaped sealing plate 6 is bent upward. The sealing gasket 9 has a structure where a disc-shaped part of the sealing plate 6 forming a top surface 63 and a disc-shaped part of the sealing plate 6 forming a lower surface 64 are joined to a hollow shaft portion 92 to be inserted into the opening 61 of the sealing plate 6. The shaft portion 92 of the sealing gasket 9 is then inserted into the opening 61 of the sealing plate 6 in a fitted state. The positive electrode terminal 7 has a shape in which a cylindrical shaft portion 72 is formed on a lower surface of a disk-shaped head 71. The shaft portion 72 is inserted into a hollow portion 91 in the shaft portion 92 of the sealing gasket 9. That is, the shaft portion 92 of the sealing gasket 9 is disposed so as to be interposed between the shaft portion 72 of the positive electrode terminal 7 and the opening 61 of the sealing plate 6.

The sealing gasket 9 may be configured as two members disposed at the respective top surface 63 and lower surface 64 of the sealing plate 6, with the shaft portion 92 provided to one member, or as a unitary molded product formed by insert molding using the sealing plate 6 as an inner mold.

The sealing body 20 is formed by crimping the metallic positive electrode terminal 7 and the metallic washer 8 to the sealing plate 6 via the sealing gasket 9 made of resin. During assembly of such a sealing body 20, the shaft portion 72 of the positive electrode terminal 7 is first inserted into the hollow portion 91 in the shaft portion 92 of the sealing gasket 9, which has been inserted into the opening 61 of the sealing plate 6, and a lower end of the shaft portion 72 is inserted into the washer 8 in a fitted state. Next, the positive electrode terminal 7 is pressed between the head 71 and a lower end surface of the shaft portion 72 in the axis 100 direction to deform the shaft portion 72 in a diameter expanding direction. This crimps the positive electrode terminal 7 to the sealing plate 6 via the sealing gasket 9. Additionally, the shaft portion 92 of the sealing gasket 9 is compressed between an inner surface of the opening 61 of the sealing plate 6 and an outer peripheral surface of the shaft portion 72 of the positive electrode terminal 7, thus fitting the shaft portion 92 of the sealing gasket 9 to the sealing plate 6.

It is only necessary to seal the outer periphery 62 of the sealing plate 6 and a top edge end 101 of the battery can 2 by laser welding or a similar method to seal up the battery can 2 with the sealing body 20 in the state assembled by the above-described process. In the cylindrical battery 1 illustrated in FIG. 1, the positive electrode 3 and a lower surface of the positive electrode terminal 7, and the negative electrode 4 and an inner surface of the battery can 2 are connected via a positive electrode tab 11 and a negative electrode tab 12, respectively. The inside of the sealed-up battery can 2 is filled with the non-aqueous organic electrolyte 30 produced by dissolving lithium salt in a non-aqueous solvent.

FIG. 2 illustrates a plan view when the sealing body 20 is viewed from above. The sealing plate 6 constituting the sealing body 20 includes a thin-walled portion 40 formed of an arc-shaped groove and having a planar shape concentric with the outer periphery 62 of this sealing plate 6 as illustrated in FIG. 2. While FIG. 2 illustrates the plan view of the sealing plate 6 when the thin-walled portion 40 is formed in the top surface 63 of the sealing plate 6 as an example, the thin-walled portion 40 may be formed in either one of the top surface 63 or the lower surface 64 of the sealing plate 6 or both of the top surface 63 and the lower surface 64. When the internal pressure inside the battery can 2 increases, the thin-walled portion 40 splits open prior to other parts of the sealing plate 6 and releases the internal pressure to the outside of the battery can 2, thus functioning as an explosion-proof safety mechanism. Japanese Unexamined Patent Application Publication No. 2005-235531 describes a sealing-type battery that includes a cleavage vent formed of arc-shaped grooves concentric with a sealing plate in both front and back surfaces of this sealing plate.

The sealing plate in a cylindrical battery described in Japanese Unexamined Patent Application Publication No. 2005-235531 has grooves, which function as an explosion-proof safety mechanism, formed into the arc shape concentric with the outer periphery of the sealing plate. Therefore, when the internal pressure inside a cylindrical battery can increases, isotropic pressure is applied to the grooves formed into the arc shape on the concentric circle, thus making it difficult to accurately regulate the pressure that splits open the sealing plate. Especially, a small cylindrical battery having a battery outer diameter of 15 mm or less such as a CR14250 type includes a sealing plate with a small area, and accordingly, an area of a cleavage part formed at the sealing plate is also small. In the case where gas is generated in a battery can in the small cylindrical battery such as the CR14250 type, pressure inside the battery can increases quickly. Therefore, it is difficult to reduce the pressure that splits open the sealing plate. This possibly results in a spouting of contents from the split-open part.

SUMMARY

One aspect of this disclosure to achieve the above-mentioned object is a sealing body of a cylindrical battery, including: a metallic disk sealing plate that includes a through-hole and a thin-walled portion, the through-hole being formed at a center of the metallic disk, the thin-walled portion being formed into a groove in a planar surface of the disk, the sealing plate being mounted to a cylindrical battery can having a closed bottom so as to seal an opening of the battery can, the battery can doubling as an electrode current collector of one of a positive or negative electrode and housing a power generating element; an electrode terminal of another of the positive or negative electrode, the electrode terminal including a shaft portion inserted into the through-hole and fitted to the sealing plate; and a sealing gasket made of resin interposed between the shaft portion and the through-hole, the thin-walled portion being not along a concentric circle of an outer periphery of the sealing plate and being formed into an arc shape.

DESCRIPTION OF EMBODIMENTS

Figure 1:
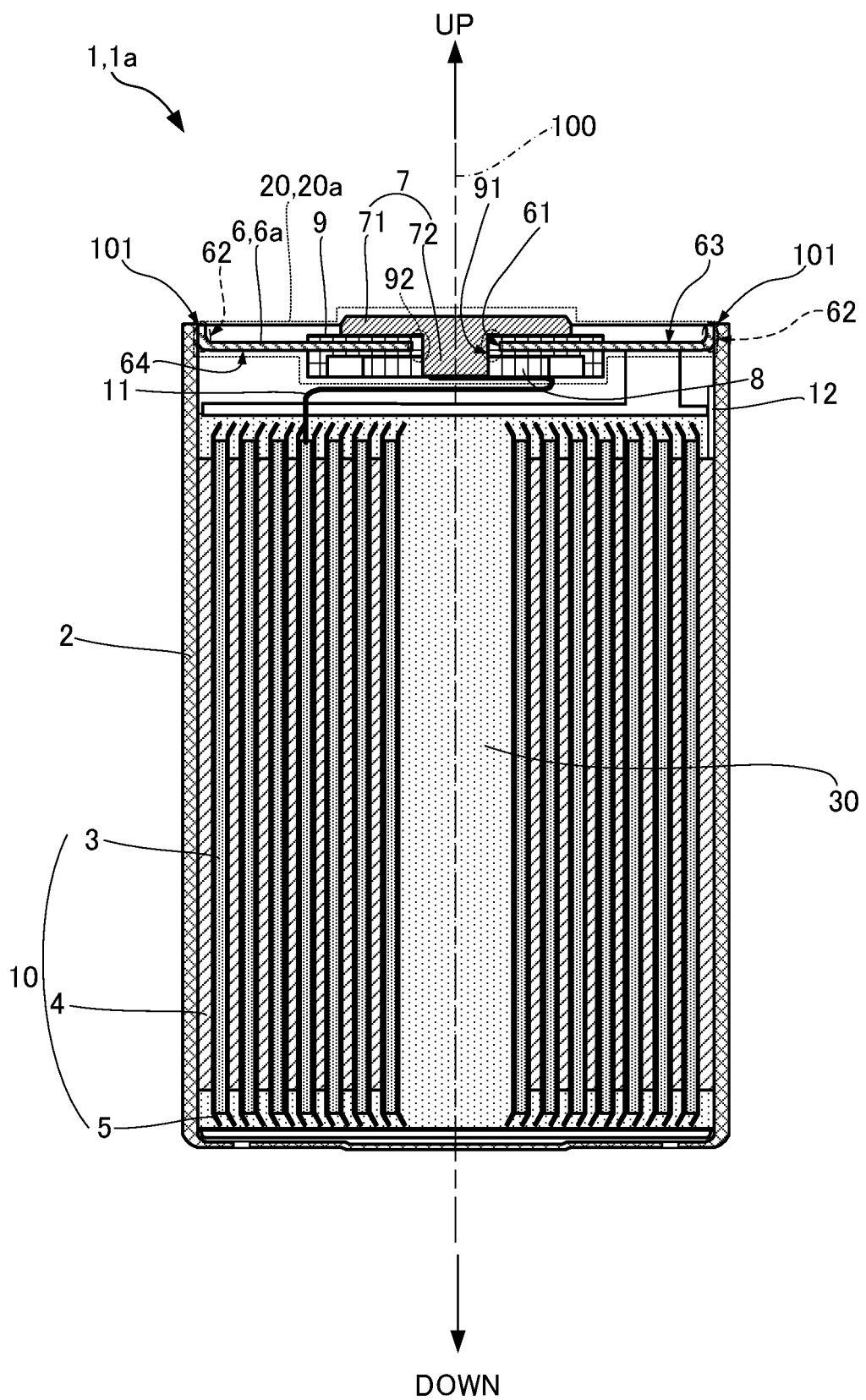
FIG. 1 is a vertical cross-sectional view illustrating a sealing structure of a cylindrical battery.
Figure 2:
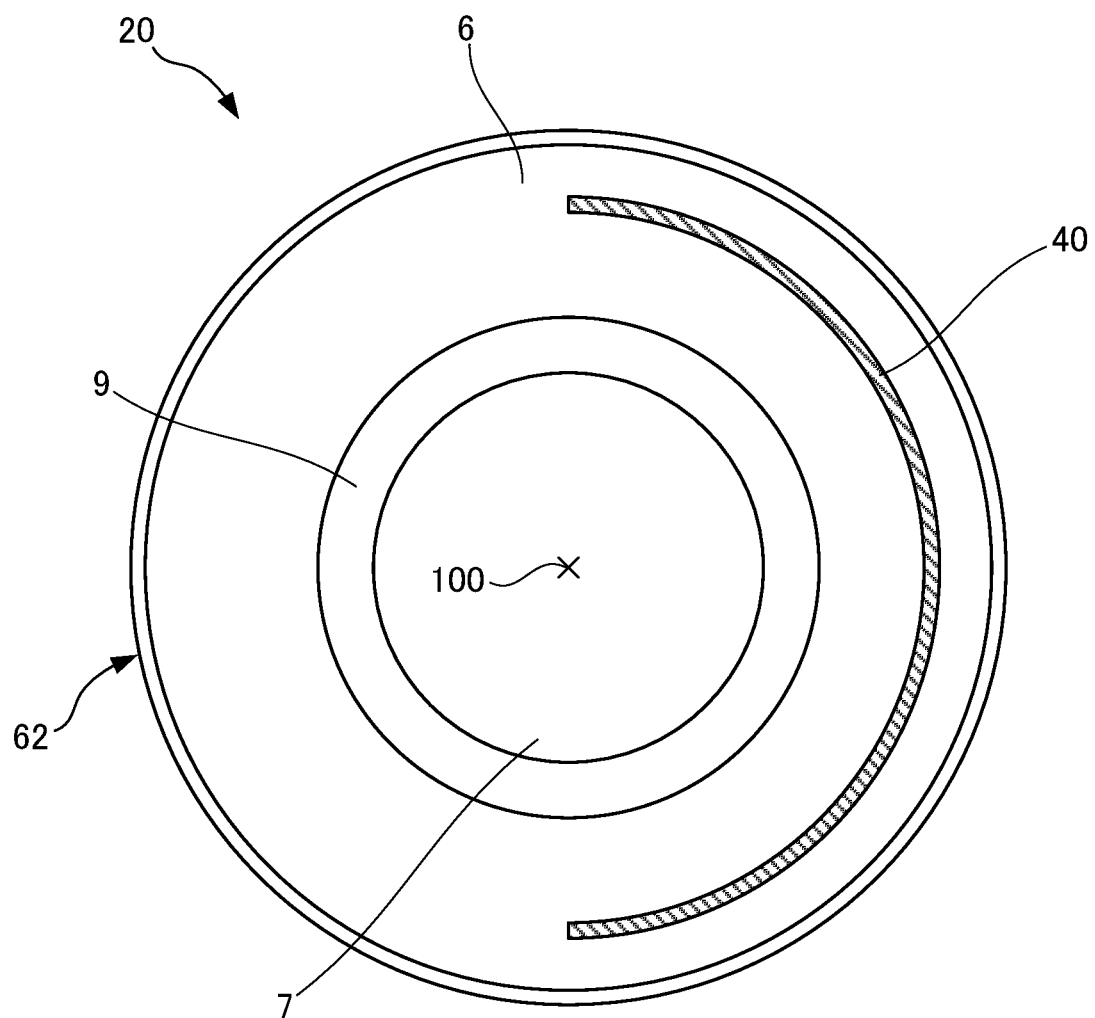
FIG. 2 is a plan view of a sealing body included in the cylindrical battery.

In describing embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operate in a similar manner, and achieve a similar result.

The following describes embodiments of this disclosure with reference to the attached drawings. Like reference numerals designate identical or similar parts in the drawings used for the following description, and therefore such elements may not be further elaborated. In some drawings, unnecessary reference numerals may be omitted in the description.

Referring now to the drawings, wherein like reference numerals designate identical or corresponding parts throughout the several views thereof, a sealing body and a cylindrical battery according to embodiments of the present disclosure are described. As used herein, the singular forms "a", "an", and "the" are intended to include the plural forms as well, unless the context clearly indicates otherwise.

Embodiment

Figure 3A:
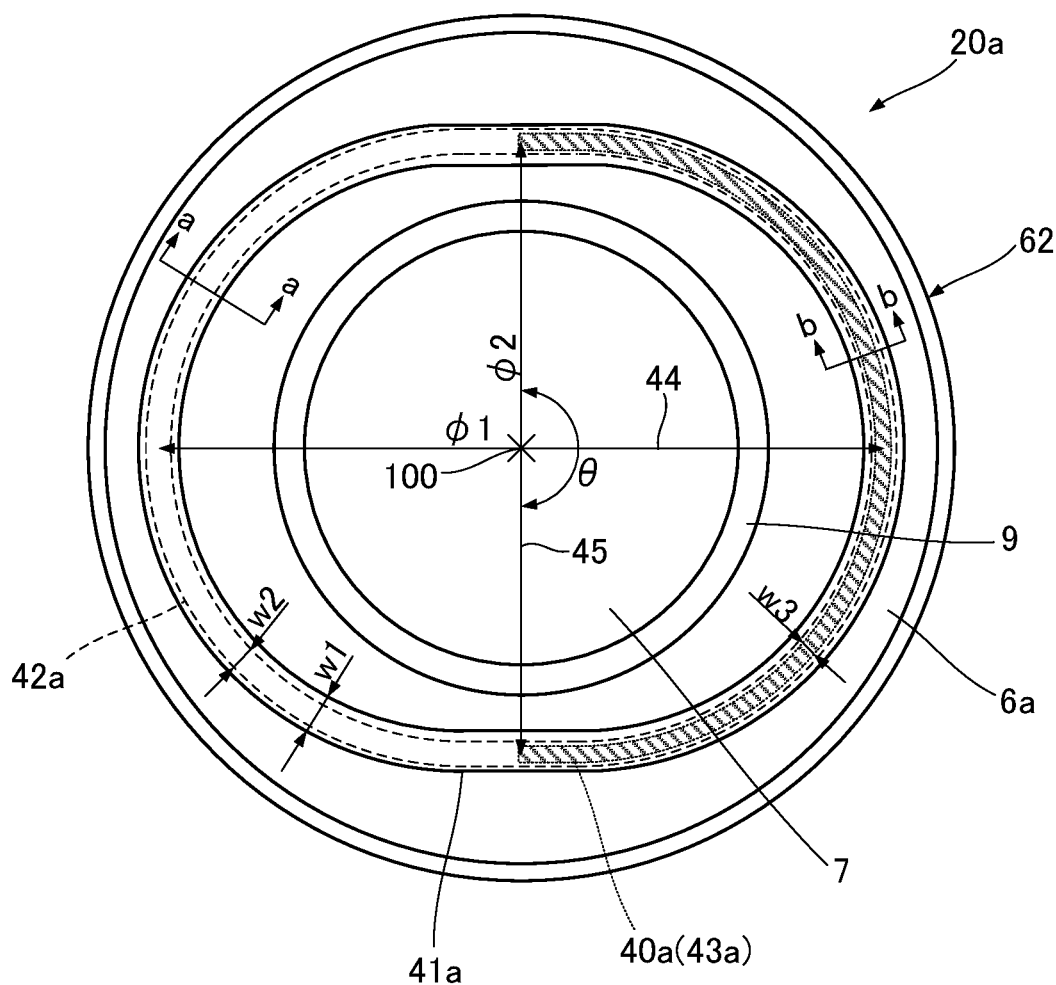
FIG. 3A is a drawing illustrating a structure of a sealing body of a cylindrical battery according to an embodiment of the present disclosure.
Figure 3B:
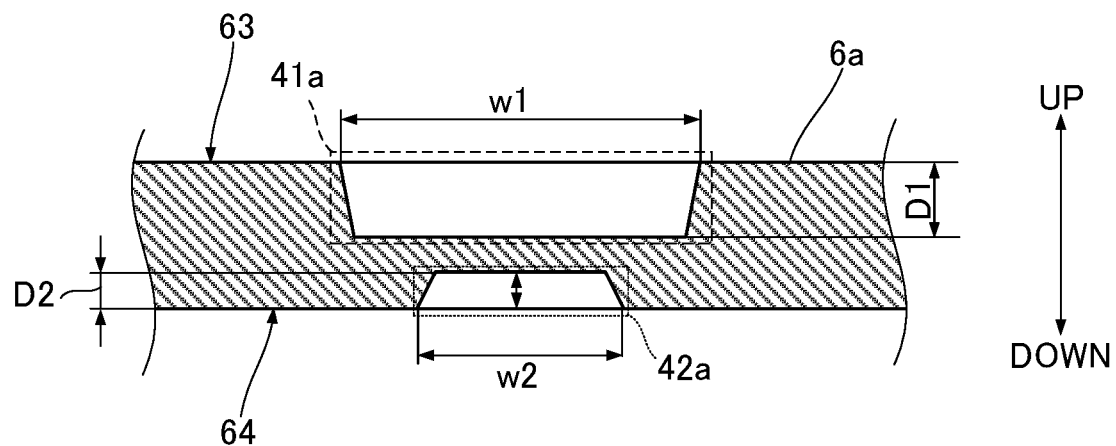
FIG. 3B is a drawing illustrating a structure of the sealing body of the cylindrical battery according to the embodiment of the present disclosure.
Figure 3C:
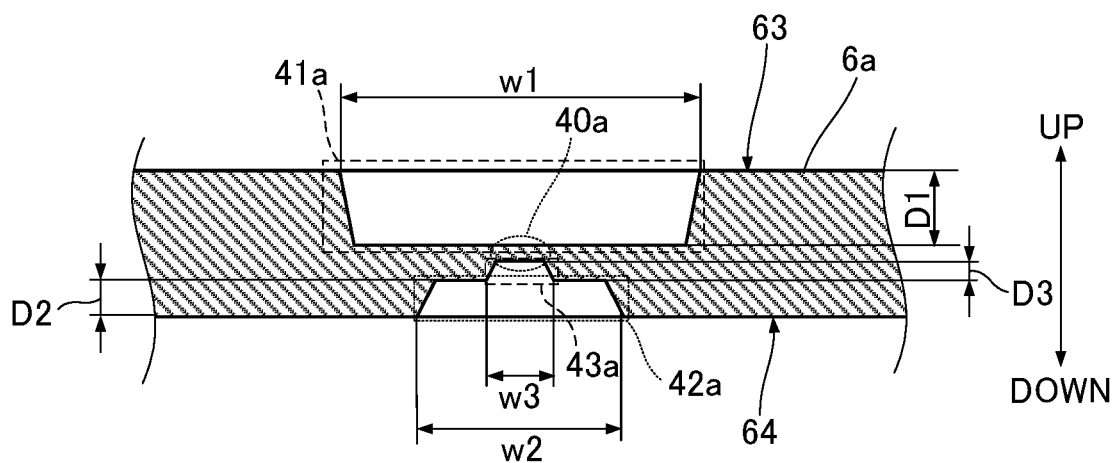
FIG. 3C is a drawing illustrating a structure of the sealing body of the cylindrical battery according to the embodiment of the present disclosure.

FIG. 3A, FIG. 3B, and FIG. 3C each illustrate a sealing body 20a according to an embodiment of this disclosure. The sealing body 20a, for example, is used to constitute a cylindrical battery 1a instead of the sealing body 20 of the cylindrical battery 1 such as the spiral-type lithium primary battery illustrated in FIG. 1. The sealing body 20a is formed by fitting one of a positive or negative electrode terminal 7 to a metallic disk-shaped sealing plate 6a via a sealing gasket 9. The sealing body 20a of this embodiment includes a thin-walled portion 40a. Thus, even if a large amount of gas is generated inside a battery can 2 constituting the cylindrical battery 1a, the sealing body 20a can reliably discharge the gas before internal pressure of the battery can 2 becomes excessive.

FIG. 3A, FIG. 3B, and FIG. 3C each illustrate a structure of the sealing body 20a according to the present embodiment. FIG. 3A is a plan view when this sealing body 20a is seen from above, and FIG. 3B is a cross-sectional view along arrow a-a in FIG. 3A. FIG. 3C is a cross-sectional view along arrow b-b in FIG. 3A. As illustrated by diagonal hatching in FIG. 3A, the thin-walled portion 40a is formed by a groove 43a in a planar surface of the sealing plate 6a, the groove 43a being along the plane of but shifted from a circle concentric with a circular outer periphery 62 of the sealing plate 6a. This shifting away from a concentric circle of the outer periphery 62 means that the groove 43a is not along the concentric circle of the outer periphery 62, that is, is not concentric with the outer periphery 62. Additionally, the groove 43a has a shape (non-annular shape) which is not annular. Thus, the groove 43a is formed into, for example, an arc shape. Accordingly, when the internal pressure of the battery can 2 increases, stress applied to the thin-walled portion 40a becomes unbalanced, and thus a part subjected to relatively high stress splits open prior to other parts of the thin-walled portion 40a. That is, the explosion-proof safety mechanism accurately operates at a predetermined pressure at which the pressure inside the battery can 2 is lower than the conventional pressure.

As illustrated in FIG. 3B, the sealing body 20a of this embodiment includes, on a top surface (one surface) 63 of the sealing plate 6a, a groove (hereinafter also referred to as an upper groove 41a (first groove)) shaped into a track form like that in track and field events, which has a closed oval planar shape. Here, the term "closed planar shape" means an annular shape. A closed track-shaped (namely, an annular) groove (hereinafter also referred to as a lower groove 42a (second groove)) is formed in a lower surface (other surface) 64 of the sealing plate 6a. The lower groove 42a has a width narrower than that of the upper groove 41a and runs along the upper groove 41a so as to overlap with the upper groove 41a. As illustrated in FIG. 3C, the thin-walled portion 40a is formed by a further narrowing of the groove 43a at the bottom (namely, the inside) of the lower groove 42a. That is, the grooves 42a, 43a with a stepped shape are formed in the lower surface 64 side of the sealing plate 6a at the part where the thin-walled portion 40a is formed.

The thin-walled portion 40a according to this embodiment has a structure that takes into account ease of manufacturing and abrasion of a press die in manufacturing the sealing plate 6a that includes the thin-walled portion 40a by presswork, in addition to the effect that the explosion-proof safety mechanism is stably operated at a low pressure. Specifically, the sealing plate 6a is made of metal (for example, SUS430) and has a disk shape including unevenness on the surface. The sealing plate 6a is manufactured by presswork. Therefore, in the case where the thin-walled portion 40a not including the above-described upper groove 41a and lower groove 42a and formed of only the deep groove 43a with the narrow width on the top surface 63 or the lower surface 64 of the sealing plate 6a is manufactured by presswork, the abrasion of the press die may be accelerated. Thus, in the sealing body 20a of this embodiment, when the sealing plate 6a is manufactured, a shallow groove with a wide width (the lower groove 42a in this example) is formed that can be produced by presswork at a low pressure such that the press die is less likely to be abraded, and then the thin-walled portion 40a is formed within the shallow lower groove 42a. Moreover, the sealing body 20a of this embodiment includes the groove (upper groove 41a) with a wide width on the top surface 63 in addition to the lower surface 64 of the sealing plate 6a and also includes the thin-walled portion 40a inside the lower groove 42a. Accordingly, the groove 43a with the narrow width, which requires the largest pressure for pressing to form the thin-walled portion 40a, has an actual depth D3 that is extremely shallow. Furthermore, the upper groove 41a and the lower groove 42a, of large volume and wide width, are formed into closed annular shapes, thus minimizing a distortion of the sealing plate 6a when those grooves (41a, 42a) are formed by presswork.

In this embodiment, the thin-walled portion 40a is formed inside only half of the track that the lower groove 42a forms. That is, the arc-shaped thin-walled portion 40a is formed in only a part of the annular lower groove 42a. In this embodiment, the thin-walled portion 40a is formed over an area where a center angle θ=180° such that the thin-walled portion 40a is symmetrical about the long axis 44 of the track of the lower groove 42a. Needless to say, the thin-walled portion 40a need not be formed over an area of the center angle θ=180°. It is sufficient if the thin-walled portion 40a reliably splits open at a predetermined target pressure when the pressure inside the battery can 2 increases and the positive electrode terminal 7 does not come off when the thin-walled portion 40a splits open, and thus the thin-walled portion 40a only needs to be appropriately configured according to a target operating pressure of the explosion-proof safety mechanism.

Performance of Explosion-Proof Safety Mechanism

Next, in order to confirm the performance of the explosion-proof safety mechanism of the sealing body 20a according to this embodiment, an opening of an empty battery can 2 not containing power generating elements was sealed with the sealing body 20a illustrated in FIG. 3A, FIG. 3B, and FIG. 3C, and a hole was formed in the bottom of the battery can 2. A valve operation test that applies hydraulic pressure from the hole formed at the bottom of the battery can 2 to the inside of the battery can 2 was conducted to ascertain the pressure at which the sealing plate 6a splits open. The battery can 2 and the sealing body 20a used in the cylindrical battery 1a (for example, the CR14250 type) with an outer diameter of 14.0 mm were used. A ratio of a major axis φ1 to a minor axis φ2 of the track-shaped upper groove 41a and lower groove 42a illustrated in FIG. 3A was set to φ1: φ2=1:1.15. The configuration and the structure other than the sealing plate 6a in the sealing body 20a and a method for sealing the battery can 2 with the sealing body 20a were identical to those of a commercially available CR14250 type cylindrical battery. Widths w1 to w3 and depths D1 to D3 of the upper groove 41a, the lower groove 42a, and the thin-walled portion 40a illustrated in FIG. 3A, FIG. 3B, and FIG. 3C could be set according to the pressure that splits open the sealing plate 6a and were set so as to split open the sealing plate 6a at a pressure of about 2.15 MPa here.

Figure 4:
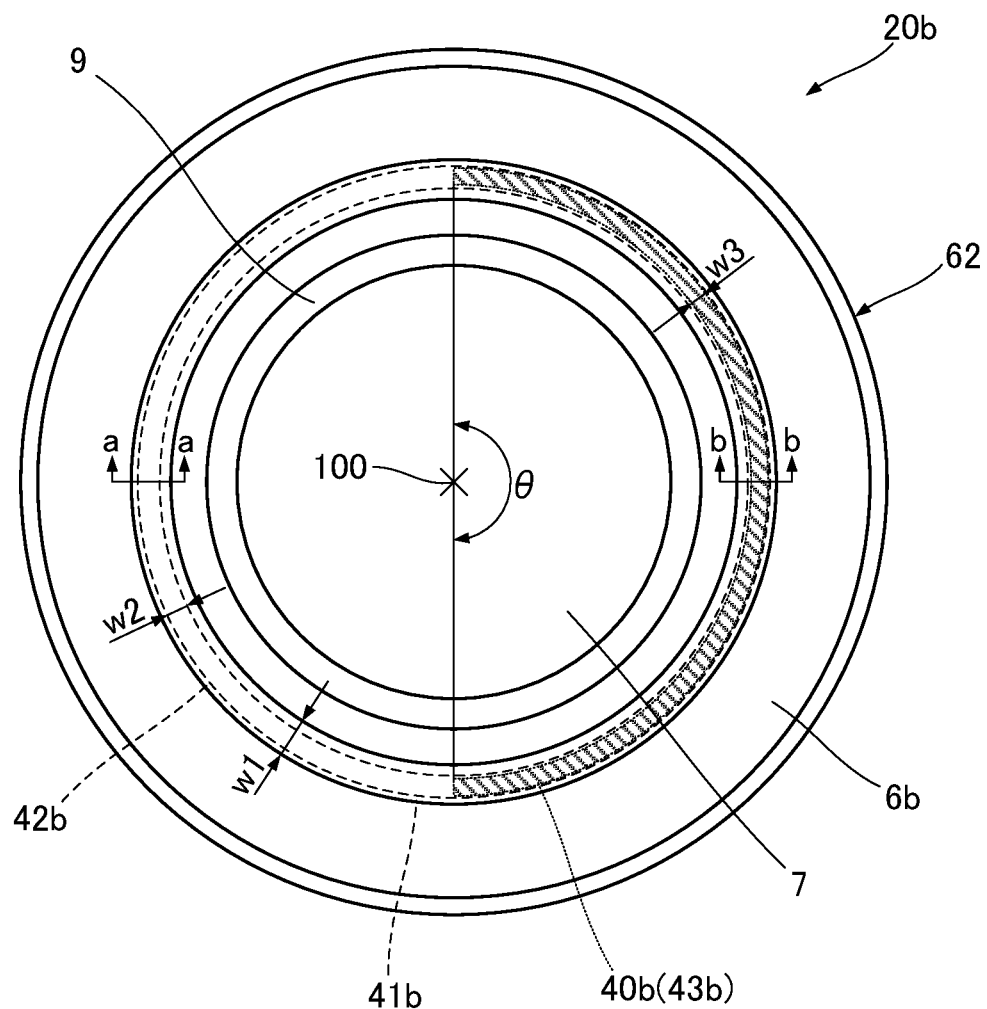
FIG. 4 is a drawing illustrating a structure of a sealing body of a cylindrical battery according to a comparative example relative to the sealing body of the cylindrical battery according to the above-mentioned embodiment.

As a comparative example relative to the sealing body 20a according to this embodiment, a sealing body 20b that includes a thin-walled portion 40b along a concentric circle of a sealing plate 6b as illustrated in FIG. 4 was manufactured and the above-described opening of the empty battery can 2, with the hole bored in the bottom, was sealed with the sealing body 20b in a similar manner to the embodiment. The above-described valve operation test was conducted on the battery can 2 sealed with the sealing body 20b according to the comparative example. FIG. 4 illustrates a plan view when the sealing body 20b according to the comparative example is viewed from above. The planar shapes of an upper groove 41b and a lower groove 42b were formed concentric with the outer periphery 62 of the sealing plate 6b, and the thin-walled portion 40b was formed into an arc shape with the center angle θ=180°. Shapes of a cross-sectional surface viewed from an arrow a-a and a cross-sectional surface viewed from an arrow b-b in FIG. 4 are similar to those of the sealing body 20a according to the embodiment illustrated in FIG. 3B and FIG. 3C. The upper grooves 41a, 41b, the lower grooves 42a, 42b, and the thin-walled portions 40a, 40b of the embodiment and the comparative example have the identical widths w1 to w3 and depths D1 to D3. Five battery cans 2 sealed with the sealing bodies 20a, 20b according to the embodiment and five of the comparative example were prepared for the valve operation test. The five battery cans 2 sealed with the sealing bodies 20a according to the embodiment were examined for the pressure at which the sealing plates 6a split open. Similarly, the five battery cans 2 sealed with the sealing bodies 20b according to the comparative example were examined for pressure at which the sealing plates 6b split open.

The sealing bodies 20b according to the comparative example split open at a pressure of 2.30 MPa to 2.75 MPa, with the average value being 2.50 MPa. By contrast, the sealing bodies 20a according to the embodiment split open at a pressure of 2.12 MPa to 2.20 MPa, with the average value being 2.16 MPa. Accordingly, in the sealing body 20a according to the embodiment, the sealing plate can split open at a pressure about 15% lower than that of the sealing body 20b according to the comparative example. Moreover, while a variation (maximum value−minimum value)/minimum value of the pressure at which the sealing plate splits open was around 20% in the comparative example, the variation was 3% in the embodiment. Thus it could be confirmed that the cylindrical battery 1a using the sealing body 20a according to the embodiment operates the explosion-proof safety mechanism at the predetermined pressure with extremely high accuracy.

Other Embodiments

The sealing body 20a according to the above-described embodiment is incorporated into a spiral-type lithium primary battery. However, needless to say, a battery into which the sealing body 20a according to the embodiment is incorporated may be a battery including the cylindrical metallic battery can 2.

The sealing body 20a according to the embodiment includes the thin-walled portion 40a along an oval track formed in the sealing plate 6a. However, for example, the thin-walled portion 40a may be formed along a circle as long as the circle is not concentric with the outer periphery 62 of the sealing plate 6a. That is, the circle may also be a circle offset from the cylinder axis 100 of the cylindrical battery 1a that is the center of the outer periphery 62 of the sealing plate 6a. Additionally, the thin-walled portion 40a may have a regular polygon shape about the cylinder axis 100. That is, it is only necessary that the thin-walled portion 40a not be formed along a concentric circle of the disk-shaped sealing plate 6a.

In the above-mentioned embodiment, durability of the press die when the sealing plate 6a is manufactured by presswork is considered. The upper groove 41a and the lower groove 42a, which trace identical shapes, are formed in the top surface 63 and the lower surface 64 of the sealing plate 6a, respectively. The groove 43a with the narrow width is formed at the bottom of the lower groove 42a in the region where the thin-walled portion 40a is formed, and the groove 43a has the stepped cross-section where the width decreases toward the outer side. Needless to say, the groove 43a may be formed at the bottom of the upper groove 41a.

Only one of the upper groove 41a and the lower groove 42a need be provided. In this case, the groove 43a may be formed in the top surface 63 or the lower surface 64 or may be formed in both the top surface 63 and the lower surface 64.

In other words, in the case where the sealing plate 6a includes the upper groove 41a but does not include the lower groove 42a, the groove 43a may be formed at the bottom of the upper groove 41a, may be formed in the lower surface 64 so as to overlap with the upper groove 41a, or may be formed in both the bottom of the upper groove 41a and the lower surface 64.

In the case where the sealing plate 6a does not include the upper groove 41a but includes the lower groove 42a, the groove 43a may be formed so as to overlap with the lower groove 42a in the top surface 63, may be formed at the bottom of the lower groove 42a, or may be formed in both the top surface 63 and the bottom of the lower groove 42a.

Further, if a highly durable press die is used, the cross-sectional shape of the thin-walled portion 40a may be a simple groove shape. In addition, the upper groove 41a and the lower groove 42a running around the whole circumference of the sealing plate 6a need not be formed, with only the groove serving as the thin-walled portion 40a formed.

The above-described embodiments are intended to facilitate an understanding of the present disclosure and are not in any way to be construed as limiting the present disclosure. The present disclosure may be modified and improved without departing from the scope of the disclosure, and any such equivalents thereof are also encompassed by the disclosure.

What is claimed is:

1. A sealing body of a cylindrical battery, comprising:
a metallic disk sealing plate that includes a through-hole and a thin-walled portion, the through-hole being formed at a center of the metallic disk, the thin-walled portion being formed into a groove in a planar surface of the disk, the sealing plate being mounted to a cylindrical battery can having a closed bottom so as to seal an opening of the battery can, the battery can doubling as an electrode current collector of one of a positive or negative electrode and housing a power generating element;
an electrode terminal of another of the positive or negative electrode, the electrode terminal including a shaft portion inserted into the through-hole and fitted to the sealing plate; and
a sealing gasket made of resin interposed between the shaft portion and the through-hole,
the thin-walled portion being not along a concentric circle of an outer periphery of the sealing plate and being formed into an arc shape,
the sealing plate including an annular, non-circular first groove in one surface of the disk, the first groove being symmetrical about a diameter direction of the disk, and
the thin-walled portion being formed at a position overlapping with the first groove in the one surface or another surface of the disk,
wherein the first groove surrounds the through-hole,
wherein the sealing plate further includes an annular second groove at a position overlapping with the first groove in the other surface, the second groove having a width narrower than a width of the first groove, and
wherein the thin-walled portion is formed inside the first groove or the second groove.

2. A spiral-type cylindrical lithium primary battery comprising:
a cylindrical battery can with a bottom, which doubles as an electrode current collector of one of a positive or negative electrode;
a power generating element housed in the battery can; and
a sealing body mounted to the battery can so as to seal an opening of the battery can,
the sealing body including:
a metallic disk sealing plate including a through-hole and a thin-walled portion, the through-hole being formed at a center of the metallic disk, the thin-walled portion being formed into a groove in a planar surface of the disk;
an electrode terminal of another of the positive or negative electrode, the electrode terminal including a shaft portion inserted into the through-hole and fitted to the sealing plate; and
a sealing gasket made of resin interposed between the shaft portion and the through-hole,
the thin-walled portion being not along a concentric circle of an outer periphery of the sealing plate and being formed into an arc shape,
the sealing plate including an annular, non-circular first groove in one surface of the disk, the first groove being symmetrical about a diameter direction of the disk, and
the thin-walled portion being formed at a position overlapping with the first groove in the one surface or another surface of the disk wherein the sealing plate includes an annular second groove at a position overlapping with the first groove in the other surface, the second groove having a width narrower than a width of the first groove,
the first groove and the second groove surround the through-hole, and
the thin-walled portion is formed inside the first groove or the second groove.

* * * * *